US012672609B2

(12) United States Patent　　　　(10) Patent No.: US 12,672,609 B2
Bittner et al.　　　　　　　　　　　(45) Date of Patent:　　Jul. 7, 2026

(54) COMBINE HARVESTER HAVING PROGRESSIVE SEPARATOR VANES

(71) Applicant: CNH Industrial America LLC, New Holland, PA (US)

(72) Inventors: Roy Bittner, Reedsville, WI (US); Kenneth Bittner, Haubstadt, IN (US)

(73) Assignee: CNH Industrial America LLC, New Holland, PA (US)

( * ) Notice: Subject to any disclaimer, the term of this patent is extended or adjusted under 35 U.S.C. 154(b) by 363 days.

(21) Appl. No.: 18/368,715

(22) Filed: Sep. 15, 2023

(65) Prior Publication Data

US 2025/0089621 A1　　Mar. 20, 2025

(51) Int. Cl.
　　　*A01F 12/18*　　　(2006.01)
　　　*A01F 7/06*　　　(2006.01)
　　　*A01F 12/24*　　　(2006.01)
(52) U.S. Cl.
　　　CPC ............ *A01F 12/181* (2013.01); *A01F 7/067* (2013.01); *A01F 12/24* (2013.01)
(58) Field of Classification Search
　　　CPC ... A01F 7/00–7/70; A01F 12/00–12/60; A01F 7/067; A01F 12/181; A01F 12/24; A01D 41/00–41/16
　　　See application file for complete search history.

(56) References Cited

U.S. PATENT DOCUMENTS

| | | | | |
|---|---|---|---|---|
| 4,244,380 | A | * | 1/1981 | DePauw ................. A01F 7/067 |
| | | | | 460/108 |
| 7,473,170 | B2 | | 1/2009 | McKee et al. |
| 7,717,777 | B2 | | 5/2010 | Pope et al. |
| 8,231,446 | B2 | | 7/2012 | Pope et al. |
| 9,788,491 | B2 | * | 10/2017 | Duquesne ............... A01F 12/18 |
| 10,051,790 | B2 | | 8/2018 | Regier |
| 10,058,035 | B2 | | 8/2018 | Kemmerer et al. |
| 2011/0320087 | A1 | * | 12/2011 | Farley ..................... A01F 7/067 |
| | | | | 701/34.2 |
| 2016/0262309 | A1 | * | 9/2016 | Regier .................... A01F 12/22 |
| 2018/0153104 | A1 | * | 6/2018 | Matousek ............. B60K 11/08 |
| 2024/0268270 | A1 | * | 8/2024 | Mitsui .................... A01F 12/00 |

* cited by examiner

*Primary Examiner* — Joseph M Rocca
*Assistant Examiner* — Madeline I Runco
(74) *Attorney, Agent, or Firm* — Buchanan Ingersoll & Rooney PC

(57) ABSTRACT

A threshing and separating system for a combine harvester includes a threshing cage and a plurality of movable vanes mounted to the threshing cage. The threshing cage partially surrounds a threshing rotor. The plurality of movable vanes are moveable between a first position in which all of the vanes of the plurality of movable vanes are substantially parallel with one another and a second position in which an acute angle is defined between each pair of adjacent vanes of the plurality of movable vanes. The acute angles progressively increase in the rearward direction of the threshing cage such that the acute angle between adjacent vanes at a forward end of the threshing cage is less than the acute angle between adjacent vanes at a rearward end of the threshing cage.

13 Claims, 3 Drawing Sheets

COMBINE HARVESTER HAVING PROGRESSIVE SEPARATOR VANES

BACKGROUND OF THE INVENTION

1. Field of the Invention

The present invention relates to agricultural vehicles, and, more particularly, to threshing systems of agricultural vehicles which include adjustable rotor vanes.

2. Description of the Related Art

As is described in U.S. Pat. No. 10,058,035, a rotary threshing or separating system of a combine harvester includes one or more threshing rotors which can extend axially (front to rear) or transversely within the body of the combine, and which are partially or fully surrounded by a perforated concave. The one or more threshing rotors are provided with rasp bars that interact with the crop matter to separate grain and to provide positive crop movement. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

To move crop material through the threshing chamber, a rotor cage can be equipped with one or more vanes. The rotor vanes direct crop material flow through the threshing chamber as the rotor rotates so that crop material can flow across the length of the threshing chamber rather than simply tumbling within the threshing chamber. To control the speed at which crop material travels through the threshing chamber, the rotor vanes can have an adjustable pitch which allows a user to change how quickly crop material travels through the threshing chamber. While adjustable pitch vanes have helped increase the throughput of the combine by controlling the speed of crop material travel through the threshing chamber, especially when harvesting under various crop conditions, power consumption and crop loss remain as ever-present concerns in combine harvesters. Improvements to combine harvesters in the interest of reducing power consumption and crop loss are continuously sought.

SUMMARY OF THE INVENTION

According to one aspect, a threshing and separating system for a combine harvester includes a threshing cage and a plurality of movable vanes that are mounted to the threshing cage. The threshing cage is at least partially surrounds a threshing rotor. The threshing cage defines a longitudinal axis extending in a rearward direction from an inlet end of the threshing cage to an outlet end of the threshing cage. The threshing cage further defines an interior surface that is configured to face the threshing rotor. The plurality of movable vanes are moveable between a first position in which all of the vanes of the plurality of movable vanes are substantially parallel with one another and a second position in which an acute angle is defined between each pair of adjacent vanes of the plurality of movable vanes. The acute angles progressively increase in the rearward direction of the threshing cage such that the acute angle between adjacent vanes at a forward end of the threshing cage is less than the acute angle between adjacent vanes at a rearward end of the threshing cage.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
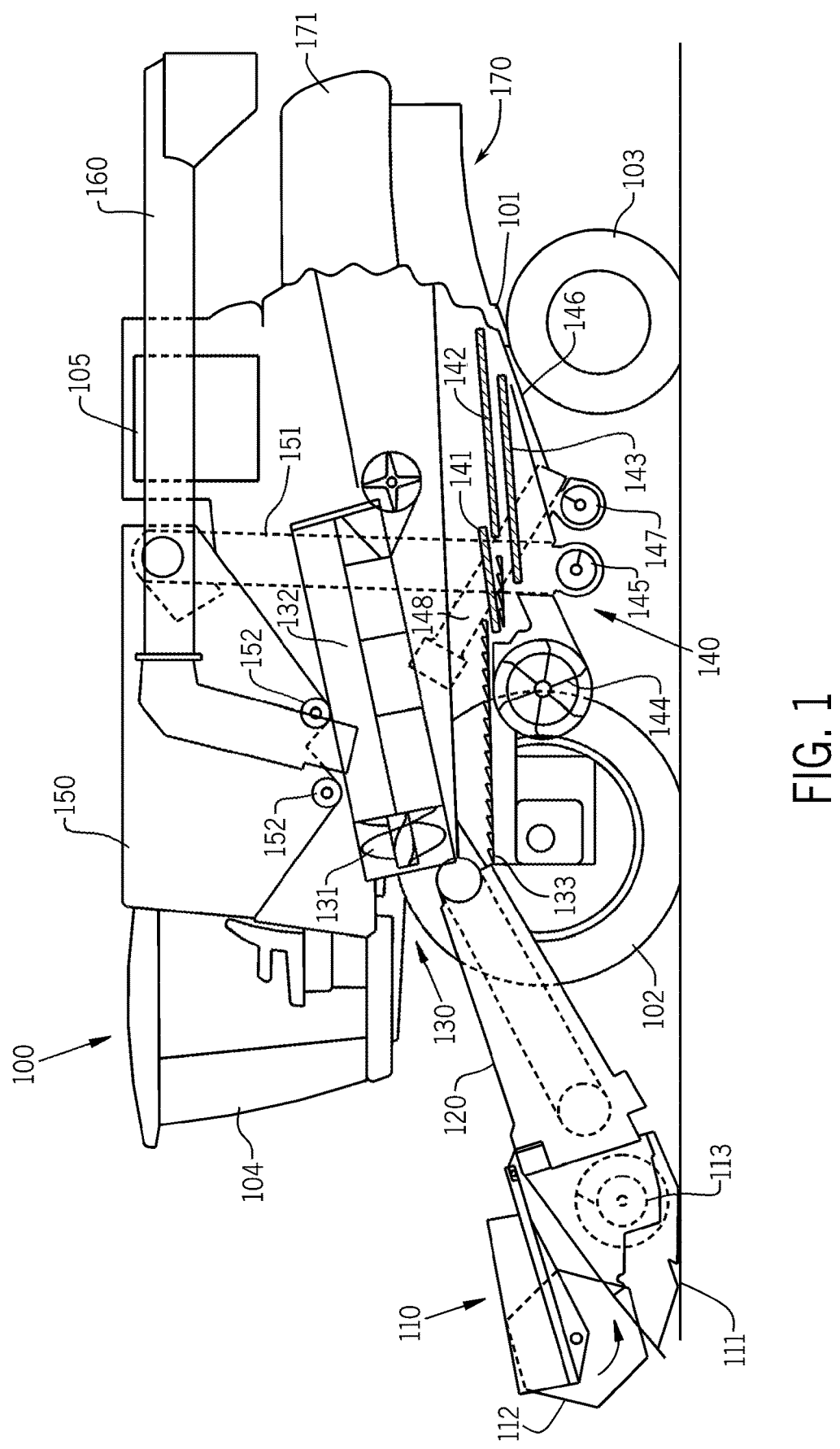
FIG. 1 is a side view of an agricultural vehicle in the form of a combine harvester, in accordance with an exemplary embodiment of the present invention.

Corresponding reference characters indicate corresponding parts throughout the several views. The exemplifications set out herein illustrate embodiments of the invention, and such exemplifications are not to be construed as limiting the scope of the invention in any manner.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, and more particularly to FIG. 1, there is shown an exemplary embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown).

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Figure 3:
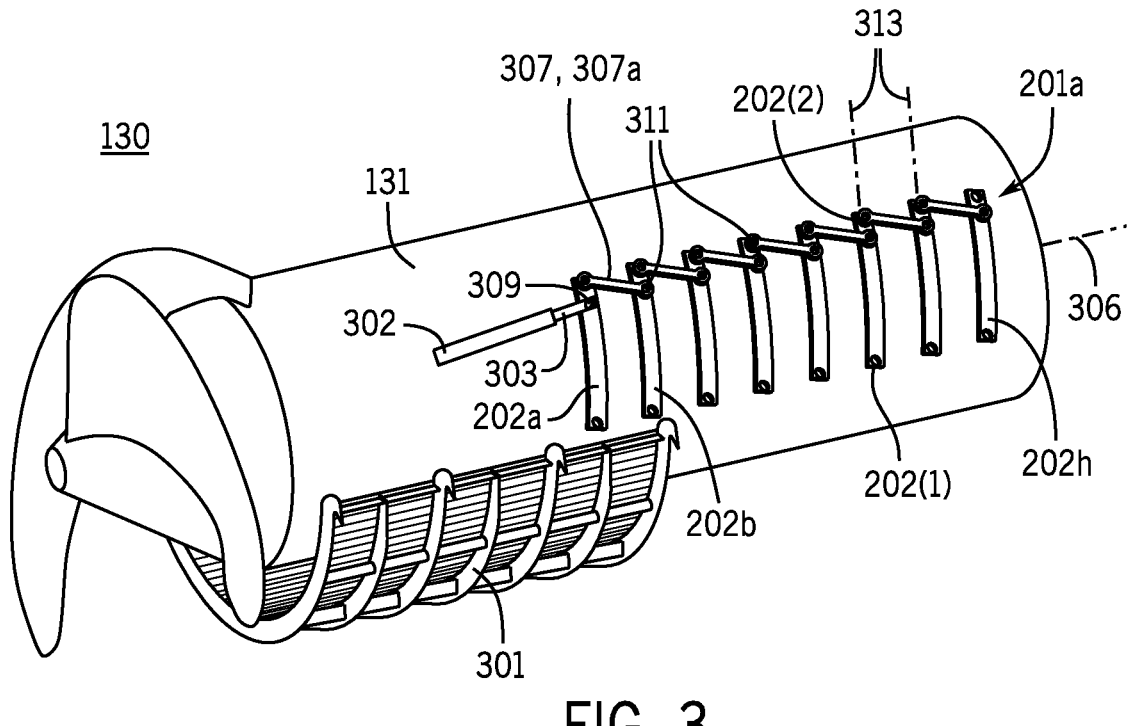
FIG. 3 is an isometric view of the threshing system of FIG. 1 showing separator vanes of the rotor cage (omitted) arranged substantially in parallel (and at a minimum angle) with respect to each other.

Threshing and separating system 130 axially arranged, and generally includes a threshing rotor 131 at least partially enclosed by a rotor cage assembly 132 and rotatable within a corresponding perforated concave 301 (FIG. 3). Cage assembly 132 is positioned about (at least) the top half of the perimeter of the rotor 131, whereas the concave 301 is positioned about the bottom half of the perimeter of the rotor 131. The shape, position and arrangement of the cage 132 and concave 301 can vary. The cut crops are threshed and separated by the rotation of rotor 131 within concave 301, and larger elements, such as stalks, leaves and the like are discharged from the rear of combine 100. Smaller elements of crop material including grain and non-grain crop material, including particles lighter than grain, such as chaff, dust and straw, are discharged through perforations of concave 301. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue handling system 170 of combine 100. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloading auger 160 for discharge from combine 100. It should be understood that the details of combine 100 can vary considerably, and the invention is not necessarily limited to the details provided above.

Figure 2:
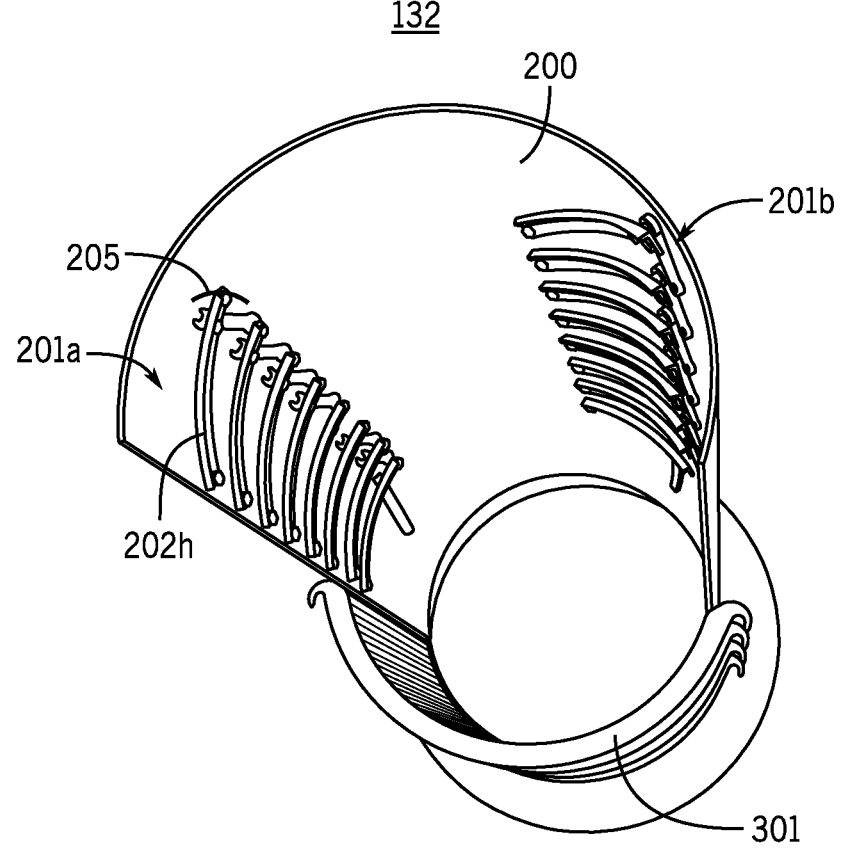
FIG. 2 is an interior side view of the rotor cage assembly of the combine of FIG. 1, the perspective of FIG. 2 is taken from a rear end of the rotor cage assembly looking toward the front end.

FIG. 2 depicts an interior view of the rotor cage assembly 132. Rotor cage assembly 132 comprises a rotor cage 200 that surrounds the rotor 131 (not shown in FIG. 2), and a series of vanes 202 that are interconnected and controlled by an actuator 302 (FIG. 3). Rotor cage 200 has a semi-circular body having arcuate slots 205 (only one shown) that permit pivoting action of the vanes 202.

Figure 4:
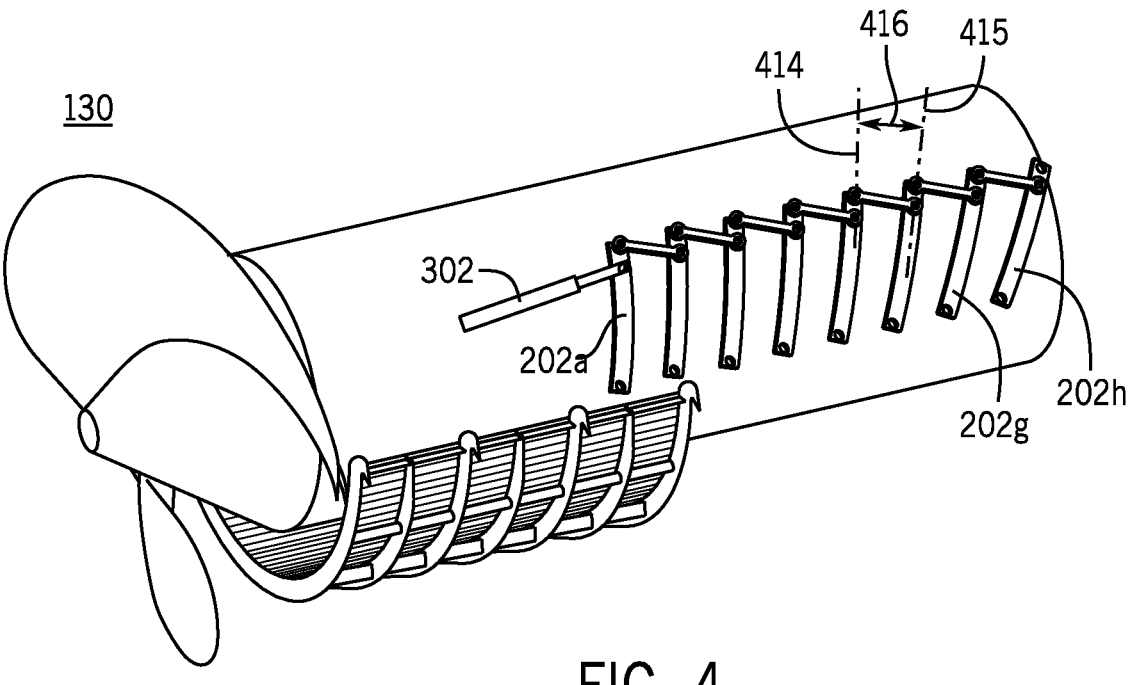
FIG. 4 is another isometric view of the threshing system of FIG. 3 showing the separator vanes arranged at a maximum angle with respect to each other.

More particularly, cage assembly 132 includes a first set 201a of eight interconnected vanes 202a-202h (referred to either individually or collectively as vane(s) 202) on one side of rotor cage 200, and a second set 201b of interconnected vanes on the other side of the cage 200. Sets 201a and 201b are substantially identical with the exception that set 201a is rotated about axis 306 relative to set 201b. Sets 201a and 201b are (optionally) controlled by different actuators. Although only one set of interconnected vanes is shown in FIGS. 3 and 4 at the near side of rotor 131, it should be understood that set 201b is positioned at the far side of rotor 131. Sets 201a and 201b are arranged so as to be rotationally spaced apart from each other so as to result in a helical motion of the crop mat. Although only set 201a will be described hereinafter, it should be understood that the details provided hereinafter also apply to set 201b.

Turning now to FIGS. 2-4, each vane 202 of set 201a has a rectangular shaped body (as viewed in cross section) including a bottom leading end 202(1) that is pivotably connected to a stationary point on the cage 200, and a top trailing end 202(2) that is opposite the bottom end 202(1). It should be understood that the leading and trailing ends of the second set 201b are opposite to that of the first set 201a. The body of each vane 202 is curved about the longitudinal axis 306 of cage 200 (as well as rotor 131). The top end 202(2) of each vane 202 includes a pin (or other device) that is positioned within a slot 205 (FIG. 2) of the cage 200 so as to permit pivoting of the top trailing end of that vane 202, as noted above. It is noted that for set 201b, the top leading end 202(1) is pivotably connected to a stationary point on the cage 200, and the bottom trailing end 202(2) is positioned within a slot of the cage 200 so as to permit pivoting of the bottom end of that vane 202.

Turning back to set 201a, the forward-most vane 202a is connected to a moveable or translatable piston or shaft 303 of an actuator 302. Shaft 303 is connected at a location or point 309 between ends 202(1) and 202(2). Point 309 is closer to top end 202(2). Stated differently, shaft 303 is connected to vane 202a at a point 309 that is spaced from the top end 202(2) of the vane 202a. Actuator 302 may be powered electrically, hydraulically or pneumatically, for example. Examples of such actuators are described in U.S. Pat. No. 10,058,035 as well as U.S. Patent App. Pub. No. 2011/0320087, which are each incorporated by reference herein in their entirety and for all purposes.

Each vane 202 is connected to an adjacent vane 202 by a link 307. Cage assembly 132 (optionally) includes seven links. For each pair of adjacent vanes 202, the forward end of each link 307 is pivotally mounted to the top end 202(2) of the forward vane 202 and the rearward end of each link 307 is pivotally mounted at a point on the rearward vane 202. In other words, and for example, the forward end of link 307*a* is pivotally mounted to the top end 202(2) of the forward vane 202*a* and the rearward end of link 307*a* is pivotally mounted at a point 311 on the rearward adjacent vane 202*b*. The point 311 is at a location that is between ends 202(1) and 202(2) of the rearward adjacent vane 202*b*, and, more particularly, at a location that is closer to top end 202(2) of the rearward adjacent vane 202*b*. It is also noted that the points 309 and 311 are arranged along a straight line. Similarly, the forward ends of the links 307 are arranged along a straight line, and the rearward ends of the links 307 are arranged along a straight line.

Turning now to FIGS. 3-4, actuator 302 is configured to simultaneously move the vanes 202 between the minimum and maximum angle positions shown in FIGS. 3 and 4, respectively.

In the minimum angle position shown in FIG. 3, the vanes 202 are positioned substantially parallel with one another, as indicated by parallel lines 313. It may be said that no angle is formed between parallel vanes 202. In the maximum angle position shown in FIG. 4, the (acute) angles 416 between adjacent vanes 202 progressively increases in the rearward direction. The angles 416 may be measured through a longitudinal axis 414 of a straight vane 202 or a tangent line 415 of a curved vane 202. The progression may be either uniform or non-uniform. For example, the angle between vanes 202 *a* and 202 *b* may be 3 degrees, whereas the angle between vanes 202 *g* and 202 *h* may be 10 degrees.

It should be understood that the vane angles affect the number of turns of the crop mat around the cage 200, and the time that the crop mat spends in the threshing system (i.e., time spent in the separation region of the rotor 131). The forwardmost vane 202*a* or vanes establish the rearward velocity of the crop mat, whereas the remainder of the vanes 202 maintain that velocity.

Maintaining the vanes 202 at their respective minimum angles shown in FIG. 3 may be used (for example) for more challenging threshing conditions. The minimum angle slows the longitudinal speed of the crop mat, thereby increasing the number of revolutions that the crop mat spends in the threshing chamber, thereby increasing the amount of threshing.

Maintaining the vanes 202 at their respective maximum angles shown in FIG. 4, will cause the rearward velocity of the crop mat to slowly increase over a longer distance, rather than all at once as caused by the first (forwardmost) vane. It is envisioned that these 'maximum' angles will maintain a higher revolution count at the front of the separating area, while 'thinning out' the crop mat towards the rear of the separating area, and without 'ribboning' the crop mat. This effect will increase the empty volume within the mat, giving the grain more opportunity for the individual grains with the most difficult paths a combination of more thrashing, more time, and more space to separate.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A threshing and separating system of a combine harvester, the threshing and separating assembly comprising:
   a threshing cage sized to at least partially surround a threshing rotor,
   wherein the threshing cage defines a longitudinal axis extending in a rearward direction from an inlet end of the threshing cage to an outlet end of the threshing cage, and
   wherein the threshing cage further defines an interior surface that faces the threshing rotor; and
   a plurality of movable vanes mounted to the interior surface of the threshing cage;
   wherein the plurality of movable vanes are moveable between a first position in which vanes of the plurality of movable vanes are substantially parallel with one another and a second position in which an acute angle is defined between each pair of adjacent vanes of the plurality of movable vanes;
   wherein the acute angles progressively increase in the rearward direction of the threshing cage such that the acute angle between one set of adjacent vanes at a forward end of the threshing cage is less than the acute angle between another set of adjacent vanes at a rearward end of the threshing cage;
   wherein the adjacent vanes are connected together by a link;
   wherein each vane of the adjacent vanes comprises a leading end and a trailing end, with one end of the link being connected to either the leading end or the trailing end of a forwardly mounted vane of the adjacent vanes and an opposing end of the link is connected at a point on a rearwardly mounted vane of the adjacent vanes, and
   wherein the point is located between the leading end and trailing end of the rearwardly mounted vane.

2. The threshing and separating system of claim 1, wherein the plurality of movable vanes comprises at least three vanes.

3. The threshing and separating system of claim 1, further comprising:
   a plurality of links,
   wherein each of the plurality of links is mounted between a respective set of the adjacent vanes of the plurality of movable vanes.

4. The threshing and separating system of claim 3, wherein each of the of plurality links is arranged parallel to one another in the first position.

5. The threshing and separating system of claim 1, wherein the opposing end of the link is pivotably connected at the point.

6. The threshing and separating system of claim 1, wherein the point is located closer to the trailing end than the leading end of the rearwardly mounted vane.

7. The threshing and separating system of claim 1, wherein each of the vane has an integral and unitary body.

8. The threshing and separating system of claim 1, wherein each of the vane is curved about the longitudinal axis.

9. The threshing and separating system of claim 1, further comprising:

an actuator that is configured to simultaneously moves the plurality of movable vanes between the first and second positions.

10. The threshing and separating system of claim 1, wherein each of the vane is slanted with respect to a vertical axis in both the first position and second position.

11. The threshing and separating system of claim 1, further comprising:

a concave positioned beneath the threshing cage.

12. The threshing and separating system of claim 11, further comprising:

the threshing rotor as positioned between the concave and the threshing cage.

13. A combine harvester comprising a threshing and separating system, the threshing and separating assembly of the combine harvester comprising:

a threshing cage sized to at least partially surround a threshing rotor, wherein the threshing cage further defines an interior surface that faces the threshing rotor;

a concave positioned beneath the threshing cage that enables the threshing rotor being located between the concave and the threshing cage;

a plurality of movable vanes mounted to the interior surface of the threshing cage;

wherein the plurality of movable vanes are moveable between a first position in which vanes of the plurality of movable vanes are substantially parallel with one another and a second position in which an acute angle is defined between each pair of adjacent vanes of the plurality of movable vanes;

wherein the adjacent vanes are connected together by a link;

wherein each vane of the adjacent vanes comprises a leading end and a trailing end, with one end of the link being connected to either the leading end or the trailing end of a forwardly mounted vane of the adjacent vanes and an opposing end of the link is connected at a point on a rearwardly mounted vane of the adjacent vanes, and wherein the point is located between the leading end and trailing end of the rearwardly mounted vane.

* * * * *